United States Patent
Hada

(10) Patent No.: US 7,430,677 B2
(45) Date of Patent: Sep. 30, 2008

(54) DATA PROCESSING DEVICE, AND CONTROL METHOD OF DATA PROCESSING DEVICE

(75) Inventor: Manabu Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/196,335

(22) Filed: Aug. 4, 2005

(65) Prior Publication Data

US 2006/0028903 A1    Feb. 9, 2006

(30) Foreign Application Priority Data

Aug. 5, 2004    (JP)    ............................. 2004-228870

(51) Int. Cl.
*G06F 1/26* (2006.01)
(52) U.S. Cl. .................. 713/323; 713/300; 713/310; 713/320; 713/321; 713/322; 713/324; 713/330; 713/340
(58) Field of Classification Search .................. 713/300, 713/310, 320–324, 330, 340
See application file for complete search history.

(56) References Cited

U.S. PATENT DOCUMENTS

| | | | |
|---|---|---|---|
| 7,057,754 B1 * | 6/2006 | Tsuchiya et al. | ............ 358/1.15 |
| 7,216,250 B2 * | 5/2007 | Matsuoka et al. | ............ 713/503 |
| 7,292,795 B2 * | 11/2007 | Kuroki et al. | ................. 399/33 |
| 7,325,151 B2 * | 1/2008 | Maruichi et al. | ............ 713/323 |
| 2006/0024072 A1 * | 2/2006 | Kuroki et al. | ................. 399/33 |

FOREIGN PATENT DOCUMENTS

| JP | 2000-196789 | 7/2000 |
|---|---|---|
| JP | 2002-359703 | 12/2002 |

* cited by examiner

*Primary Examiner*—Abdelmoniem Elamin
(74) *Attorney, Agent, or Firm*—Fitzpatrick, Cella, Harper & Scinto

(57) ABSTRACT

A multifunctional device shifts the states of plural reception units from a state that the device operates in a power saving state to a state that the device operates in an operating state, according to which of the plural reception units a reception request of data is input to. The multifunctional device can shorten a time from the reception of the reception request of the data to the reception unit to a start of a data process of the data.

22 Claims, 13 Drawing Sheets

FIG. 11

STORAGE MEDIUM SUCH
AS FD, CD-ROM, ETC.

| DIRECTORY INFORMATION |
|---|
| 1ST DATA PROC PROGRAM<br>PROGRAM CODE GROUP CORRESPONDING TO STEPS IN FLOW CHART OF FIG. 8 |
| 2ND DATA PROC PROGRAM<br>PROGRAM CODE GROUP CORRESPONDING TO STEPS IN FLOW CHART OF FIG. 9 |
| 3RD DATA PROC PROGRAM<br>PROGRAM CODE GROUP CORRESPONDING TO STEPS IN FLOW CHART OF FIG. 10 |

DATA PROCESSING DEVICE, AND CONTROL METHOD OF DATA PROCESSING DEVICE

BACKGROUND OF THE INVENTION

1. Field of the Invention

The present invention relates to a data processing device, and a control method which is applied to the data processing device.

2. Related Background Art

Conventionally, a data processing device which operates in either a power saving state or an operating state has been known. Here, in the power saving state, the data processing device can operate with the power consumption low, by shutting off the power supply to each constitutional element in the data processing device.

Incidentally, in the case where the data processing device operates in the power saving state, the power consumption of the device can surely be lowered. However, in that case, in order to cause the data processing device which is in the power saving state to again execute the data process, the image process and the like, it is necessary to shift the state of the data processing device from the power saving state to the operating state. In this connection, to shift the state of the data processing device from the power saving state to the operating state, a predetermined shift time is of course necessary. For this reason, the time necessary to start the data process, the image process and the like is prolonged by the relevant shift time.

To solve such a problem, the technique for achieving the high-speed operation of the data processing device by lowering as much as possible the shift time for shifting the state of the device from the power saving state to the operating state (for example, Japanese Patent Application Laid-Open No. 2000-196789; hereinafter called the document 1).

The data processing device (facsimile machine) in the document 1 executes the shift operation including the cleaning of the photosensitive member in a case where the toner cartridge is exchanged in the power saving state, and executes the shift operation not including the cleaning of the photosensitive member in a case where the toner cartridge is not exchanged in the power saving state. Thus, in the case where the toner cartridge is not exchanged in the power saving state, the data processing device (facsimile machine) in the document 1 can shift from the power saving state to the operating state at higher speed as compared with the case where the toner cartridge is exchanged in the power saving state.

Incidentally, the data processing device (facsimile machine) in the document 1 comprises the plural reception units (that is, the modem 7, the NCU (network control unit), the PC I/F (personal computer interface) 6) for receiving the data transmitted from an external device. Thus, when a data reception request is input to any one of the plural reception units in the power saving state of the data processing device, the data processing device starts to shift from the power saving state to the operating state.

The document 1 discloses that the data processing device is set to come into the power saving state by controlling or suppressing the power to be supplied to, e.g., the heater or the like. That is, it is possible to achieve the power saving by controlling or suppressing the power to be supplied to the heater or the like. However, in order to further lower the power consumption, it is also necessary to set the CPU of controlling the data processing device and the plural reception units of receiving the data from the external device to be in the power saving state. In such a case, although the power consumption can surely be controlled or suppressed, in the meantime, the shift time for shifting the CPU and the reception units from the power saving state to the operating state is necessary to cause the data processing device to come into the operating state as a whole.

Under the circumstances, if the order of returning the states of the plural reception units from the power saving state (that is, the state incapable of receiving data including image data) to the operating state (that is, the state capable of receiving data including image data) is previously determined, the problem that the shift time for shifting the state from the power saving state to the operating state is prolonged occurs. For example, when the data reception request is input to the modem (that is, the unit of receiving facsimile data through a public network), if the returning process of the NCU (that is, the unit of receiving data including image data through a network) for returning the state of the NCU from the power saving state to the operating state is preferentially executed according to the previously determined order, the returning process of the modem cannot be executed until the returning process of the NCU ends in spite of the fact that any data reception request is not input to the NCU. As a result, the time necessary to process the reception data by the modem to which the reception request has been input is involuntarily prolonged.

SUMMARY OF THE INVENTION

The present invention has been attained in consideration of the above conventional problem, and an object thereof is to provide an improved data processing device and a control method which is applicable to the improved data processing device.

Another object of the present invention is to provide a data processing device which can shorten a time from an input of a reception request of data to a reception means to a start of data processing of the relevant data by shifting the states of the plural reception means from a state that the data processing device operates in a power saving state to a state that the data processing device operates in an operating state, in appropriate order according to which of the plural reception means in the data processing device the reception request of the data is input, and a control method which is applicable to the relevant data processing device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view for explaining a memory map of a storage medium for storing various data processing programs which can be read by an image processing system;

DETAILED DESCRIPTION OF THE PREFERRED EMBODIMENTS

Figure 1:
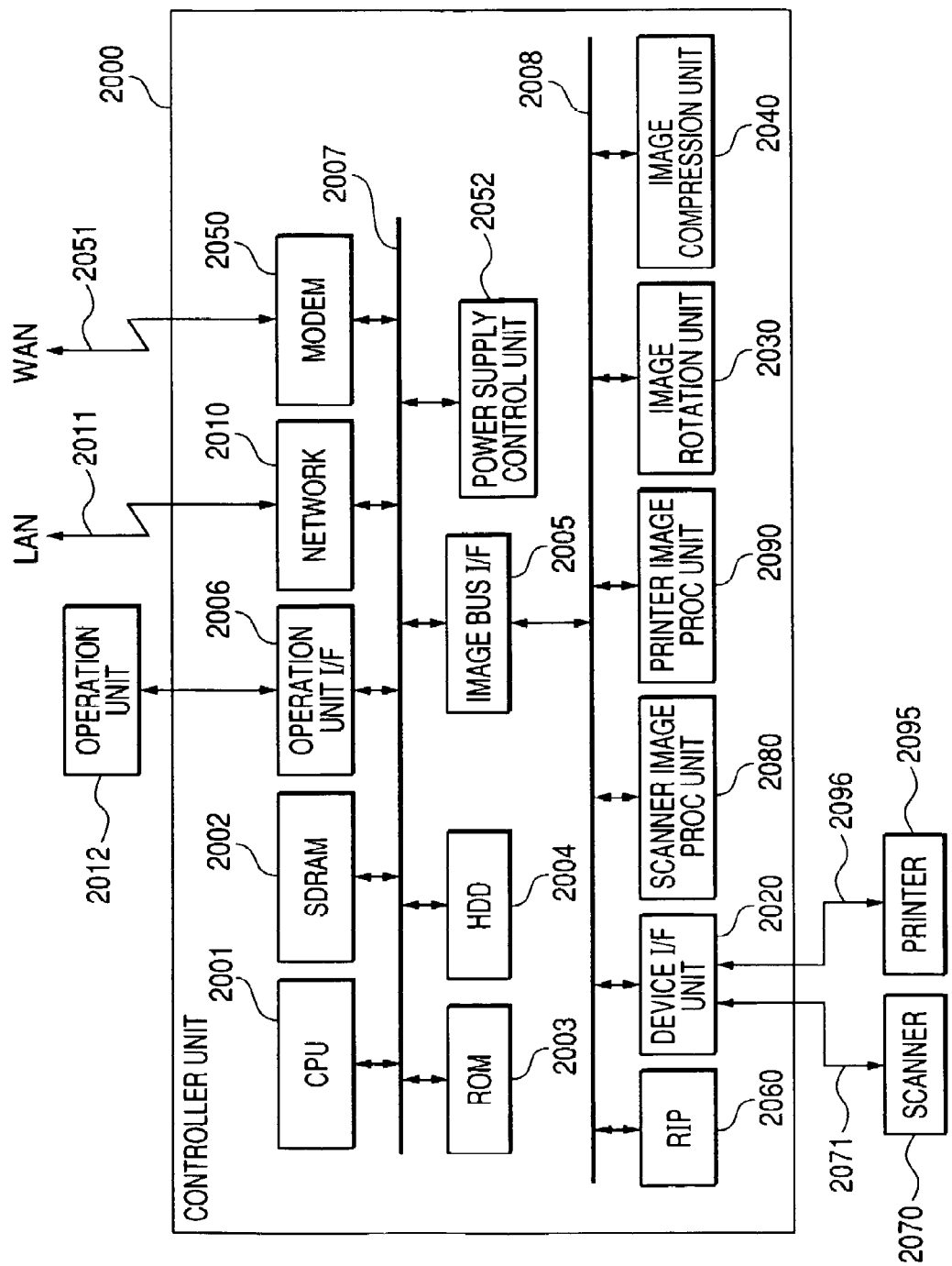
FIG. 1 is a block diagram for explaining structure of an image processing device indicating the first embodiment.

The present invention will now be described in detail with reference to the drawings showing a preferred embodiment thereof. In the drawings, elements and parts which are identical throughout the views are designated by identical reference numerals, and duplicate description thereof is omitted.

Hereinafter, the best embodiments for embodying the present invention will be explained with reference to the attached drawings.

FIG. 1 is a block diagram for explaining structure of an image processing device, as a representative of a data processing device, indicating the first embodiment of the present invention.

In FIG. 1, reference numeral 2000 denotes a CU (controller unit), which is connected to a scanner 2070 being an image input device and a printer 2095 being an image output device, while the CU 2000 is connected with a LAN (Local Area Network) 2011 or a public network (WAN (wide area network)) 2051 thereby executing input and output processes of image information or device information.

Reference numeral 2001 denotes a CPU, which is a controller for controlling the CU 2000. Reference numeral 2002 denotes an SDRAM (Synchronous Dynamic RAM), which is a system work memory used for operating the CPU 2001 and is also an image memory used for temporarily storing image data. Reference numeral 2003 denotes a ROM, which functions as a boot ROM, in which a boot program (initializing program) used for executing an initializing process for respective units in the CU 2000 by the CPU 2001 is stored.

Reference numeral 2004 denotes an HDD (hard disk drive), which stores system software and the image data. Reference numeral 2006 denotes an operation unit I/F, which functions as an interface unit between the CU 2000 and an operation unit 2012 and outputs image data to be displayed on the operation unit 2012 to the operation unit 2012. And, the operation unit I/F 2006 functions to notify information, which was input by a user of the present system from the operation unit 2012, to the CPU 2001.

Reference numeral 2010 denotes a network unit, which is connected with the LAN 2011, executes a reception process of receiving data from external devices through the LAN 2011 and a transmission process of transmitting data to the external devices through the LAN 2011. Reference numeral 2050 denotes a MODEM unit, which is connected with the public network 2051, executes a reception process of receiving facsimile data from the external devices through the public network 2051 and a transmission process of transmitting facsimile data to the external devices through the public network 2051. The above respective units are mutually connected through a system bus 2007.

Reference numeral 2005 denotes an image bus I/F, which connects the system bus 2007 with an image bus 2008 for transferring image data at high speed, is a bus bridge for converting the data structure.

The image bus 2008 is structured under the standard of a PCI (Peripheral Component Interconnect) bus or the IEEE1394. On the image bus 2008, the following devices are disposed.

Reference numeral 2060 denotes an RIP (raster image processor) unit, which executes an image process of developing PDL (Page Description Language) codes included in print data to be input from the external device through the network unit 2010 into bit-map image data. Reference numeral 2020 denotes a device I/F unit, which connects the scanner 2070 and the printer 2095 respectively being the image input device and the image output device to the CU 2000 and executes a conversion process between a synchronous system and an asynchronous system of image data.

Reference numeral 2080 denotes a scanner image processing unit, which executes image processes such as correction, processing, editing and the like to image data which was input from the scanner 2070. Reference numeral 2090 denotes a printer image processing unit, which executes image processes such as correction, resolution conversion and the like for the purpose of executing a print process at the printer 2095 to image data to be input through the image bus I/F unit 2005.

Reference numeral 2030 denotes an image rotation unit, which executes a rotation process of the image data. Reference numeral 2040 denotes an image compression unit, which executes compression/expansion processes of the JPEG (Joint Photographic image Expert Group) for multi-level image data and compression/expansion processes of the JBIG (Joint Bi-level Image expert Group), the MMR (Modified Modified READ) and the MH (Modified Huffman) for binary image data.

Numeral 2052 denotes a power supply control unit, which controls the power supply where the voltage is supplied to each unit in CU 2000, scanner 2070, and printer 2095 by the instruction from CPU 2001. Moreover, the power supply control unit 2052 turns on the power supply to each unit in CU 2000 in a case where the CU 2000 receives the data from the external device at the power saving mode.

Figure 2:
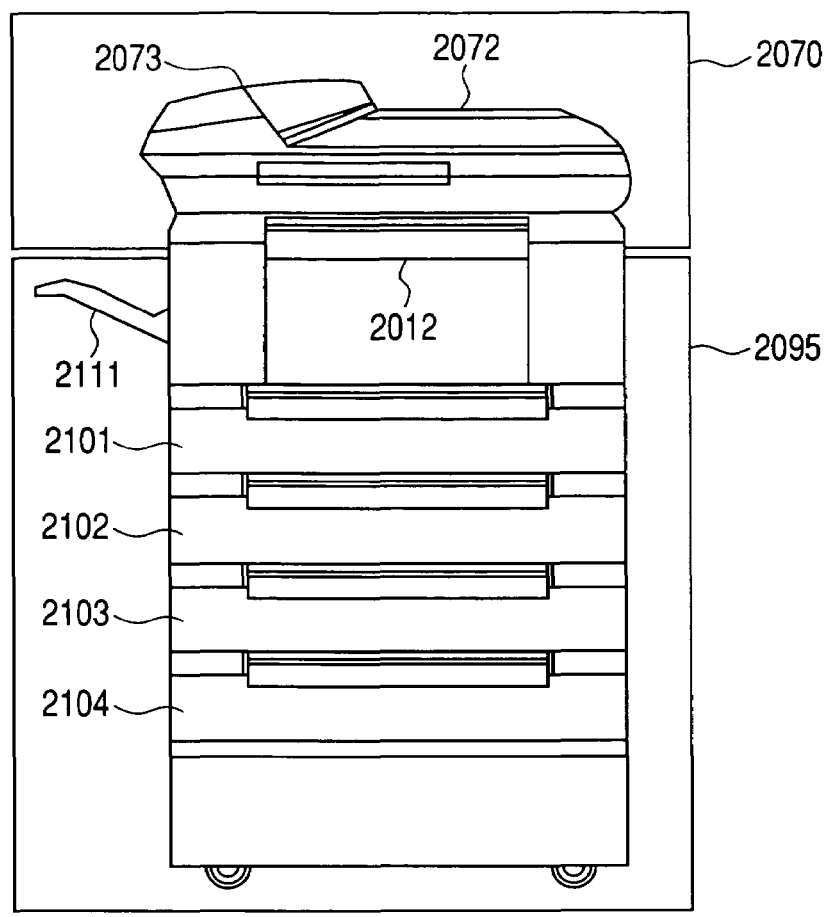
FIG. 2 is a view showing an example of an image input/output device shown in FIG. 1.

FIG. 2 is a view showing an example of the image input/output device shown in FIG. 1. In FIG. 2, the same portions as those in FIG. 1 are denoted by the same reference numerals.

In FIG. 2, the scanner 2070 being the image input device irradiates an image on a sheet being an original and converts image data into electric signals as raster image data by executing a scan by a CCD line sensor (not shown). Original sheets are set in a tray 2073 of an original feeder 2072, and a user of the device instructs to start a reading operation from the operation unit 2012 thereby the CPU 2001 gives an instruction to the scanner 2070 to execute an operation of reading an original image while the original feeder 2072 is feeding the original sheets one by one.

The printer 2095 being an image forming unit forms raster image data on the sheet as an image. As an image forming method, there are methods such as an electrophotographic method of using a photosensitive drum or a photosensitive belt, an inkjet method of directly printing an image on a sheet by discharging ink from a micro-nozzle array and another method. However, in the present embodiment, any method is available.

A printing operation by the printer 2095 is started according to an instruction from the CPU 2001. The printer 2095 has plural sheet feed units (sheet cassettes 2101, 2102, 2103 and 2104) so as to select different sheet size or different sheet direction. A sheet discharge tray 2111 is used for stacking sheets on which images were formed at the printer 2095.

Figure 3:
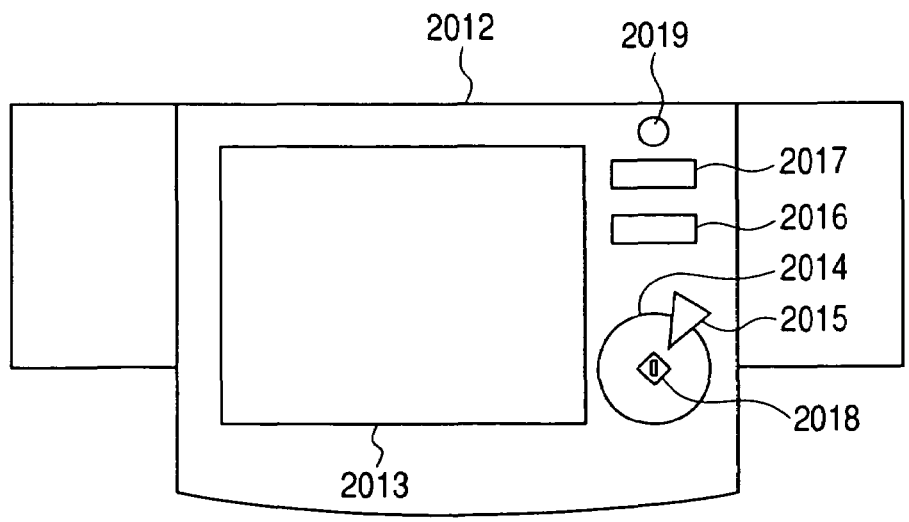
FIG. 3 is a schematic plan view for explaining structure of an operation unit shown in FIG. 1.

FIG. 3 is a schematic plan view for explaining structure of the operation unit 2012 shown in FIG. 1. In FIG. 3, the same portion as that in FIG. 1 is denoted by the same reference numeral.

In FIG. 3, reference numeral 2013 denotes an LCD (Liquid Crystal Display) unit, on which a touch panel sheet is adhered, displays an operation screen of the system and notifies location information of a depressed key to the CPU 2001 when the key displayed on the LCD is depressed.

Reference numeral 2014 denotes a start key, which is used when an operation of reading an original image is started. On a central position of the start key 2014, an LED 2018, which can be displayed by two colors red and green, is equipped. It is indicated that the start key 2014 is in a usable or unusable state by that color red or green.

Reference numeral 2015 denotes a stop key, which acts to stop a running job operation which is based on a set image processing condition. Reference numeral 2016 denotes an ID (Identification) key, which is used when a user ID is input. Reference numeral 2017 denotes a reset key, which is used when a set condition sent from the operation unit 2012 is initialized.

Figure 4:
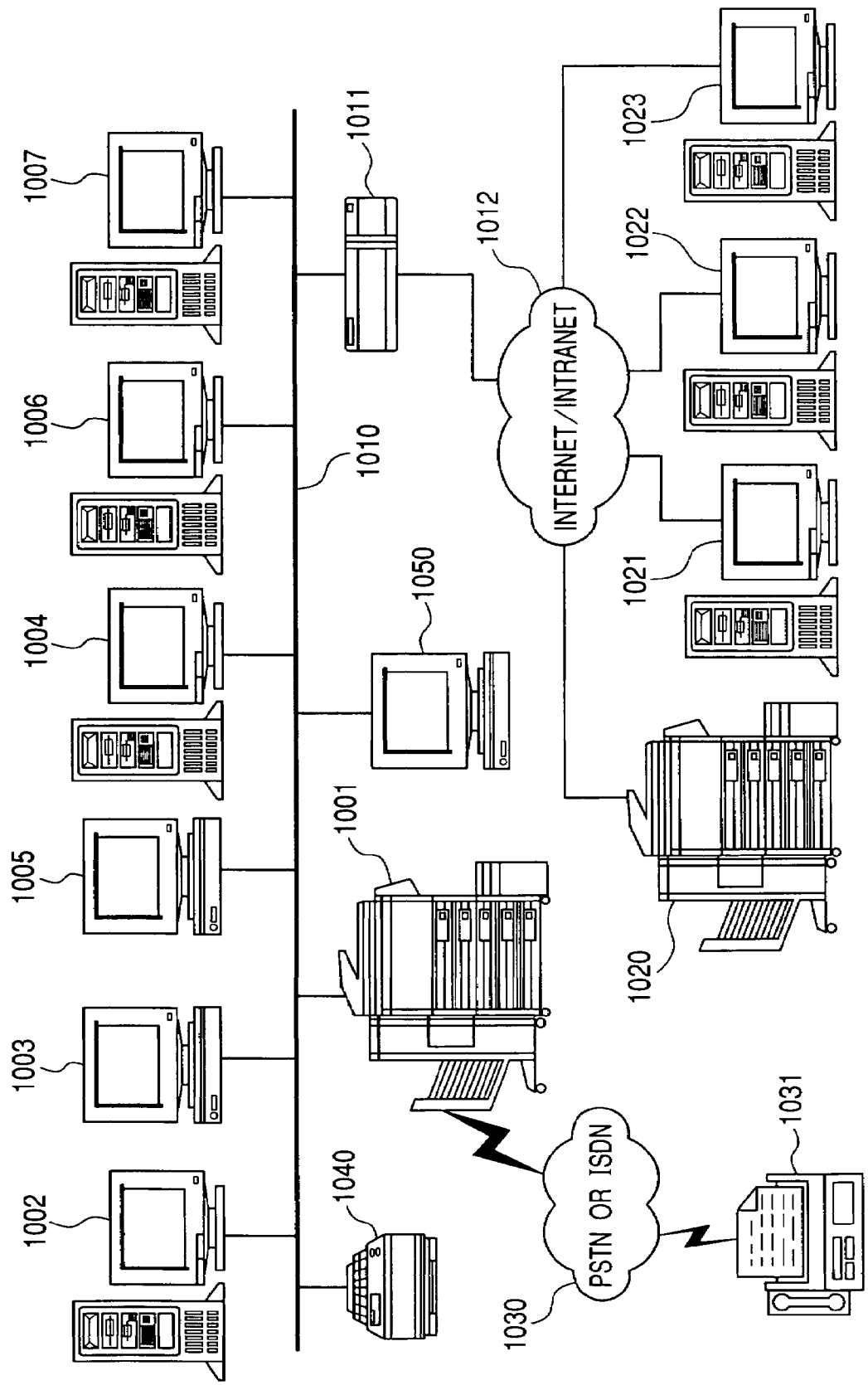
FIG. 4 is a view showing an example of a network system to which the image processing device can be applied.

FIG. 4 is a view showing an example of a network system to which the image processing device according to the present embodiment can be applied.

In FIG. 4, reference numerals 1001 and 1020 denote multiplex devices (digital multiplex devices), which are respectively composed of a scanner and a printer to be described later, can transmit image data read by the scanner to external devices through a local area network (LAN) 1010 and can print out image data received through the LAN 1010 by the printer.

Further, the image data read by the scanner can transmit to a public network 1030 such as a PSTN (Public Switched Telephone Network), an ISDN (Integrated Services Digital Network) or the like by a facsimile transmission means (not shown) and can print out image data received through the PSTN and the ISDN by the printer.

Reference numerals 1002 denotes a database server, which manages binary image data and multi-level image data read by the image processing device (multiplex device) 1001 as a database. Reference numeral 1003 denotes a database client, which can browse and search the image data stored in the database server 1002.

Reference numeral 1004 denotes an E-mail server, which can receive the image data read by the image processing device 1001 as an attachment attached to an E-mail. Reference numeral 1005 denotes an E-mail client, which can receive and browse a mail received by the E-mail server 1004 and can transmit an E-mail.

Reference numeral 1006 denotes a WWW (World Wide Web) server, which provides an HTML (Hyper Text Markup Language) document to the LAN 1010, and the HTML document provided by the WWW server 1006 can be printed out by the image processing device 1001.

Reference numeral 1011 denotes a router, which connects the LAN 1010 with an internet/intranet 1012. Devices, which are similar to the above-mentioned database server 1002, the WWW server 1006, the E-mail server 1004 and the image processing device 1001, are respectively connected to the internet/intranet 1012 as a database server 1021, a WWW server 1022, an E-mail server 1023 and the image processing device 1020.

On the other hand, the image processing device 1001 is in a state capable of executing transmission/reception with a facsimile device 1031 through the public network 1030 such as the PSTN, the ISDN or the like. Further, a printer 1040 is also connected to the LAN 1010, and it is structured that image data read by the image processing device 1001 can be printed out.

Reference numeral 1050 denotes a user host computer, which is composed of a personal computer or the like, is constituted that communication can be executed with peripheral devices (including the image processing device 1001) provided on the LAN 1010 through a network card or the like by a predetermined interactive protocol.

The user host computer 1050 has a control board which includes a CPU, a RAM, a ROM and the like, and it is assumed that a data process is controlled by a predetermined OS (Operating System).

Since scanner functions, printer functions and other multiplex functions of the multiplex devices 1001 and 1020 are already known, the explanation thereof will be omitted.

Hereinafter, a high-speed return process of returning from a power saving mode in the image processing device according to the present embodiment will be explained.

The multiplex devices 1001 and 1020 respectively operate under plural power modes different in the power to be consumed and operate at least under the power saving mode of consuming the small power and a print mode of consuming the large power as compared with the power saving mode. In the power saving mode, the multiplex devices 1001 and 1020 shut off a part (or all) of the power supplying to the scanner 2070 and the printer 2095. Further, in the power saving mode, the multiplex devices 1001 and 1020 shut off a part (or all) of the power supplying to the operation unit I/F 2006, the network unit 2010, the MODEM unit 2050, the HDD 2004, the RIP unit 2060, the device I/F unit 2020, the scanner image processing unit 2080, the image rotation unit 2030 and the image compression unit 2040 in the CU 2000. And, in the print mode, the multiplex devices 1001 and 1020 supply the power to the respective units to which the power supply was shut off in the power saving mode. In the print mode, the multiplex devices 1001 and 1020 become an operating state capable of executing an image process of image data to be received from the external devices through the network unit 2010 and the MODEM unit 2050 and an image formation process of the image data, to which the image process was executed, by the printer 2095.

It should be noted that a part (or all) of the power supplying to the units other than the CPU 2001 in the CU 2000 was shut off in the above-mentioned power saving mode, however the power to be consumed may be further reduced by shutting off the power supplying to the CPU 2001. But, in case of shutting off the power supplying to the CPU 2001 in the power saving mode, in order to shift the multiplex devices 1001 and 1020 to the print mode from the power saving mode, the CPU 2001 has to execute an initializing process to the respective units in the CU 2000 after resuming the power supplying to the CPU 2001. In the following, a case that the multiplex devices 1001 and 1020 also shut off the power supplying to the CPU 2001 in the power saving mode will be explained.

Figure 5:
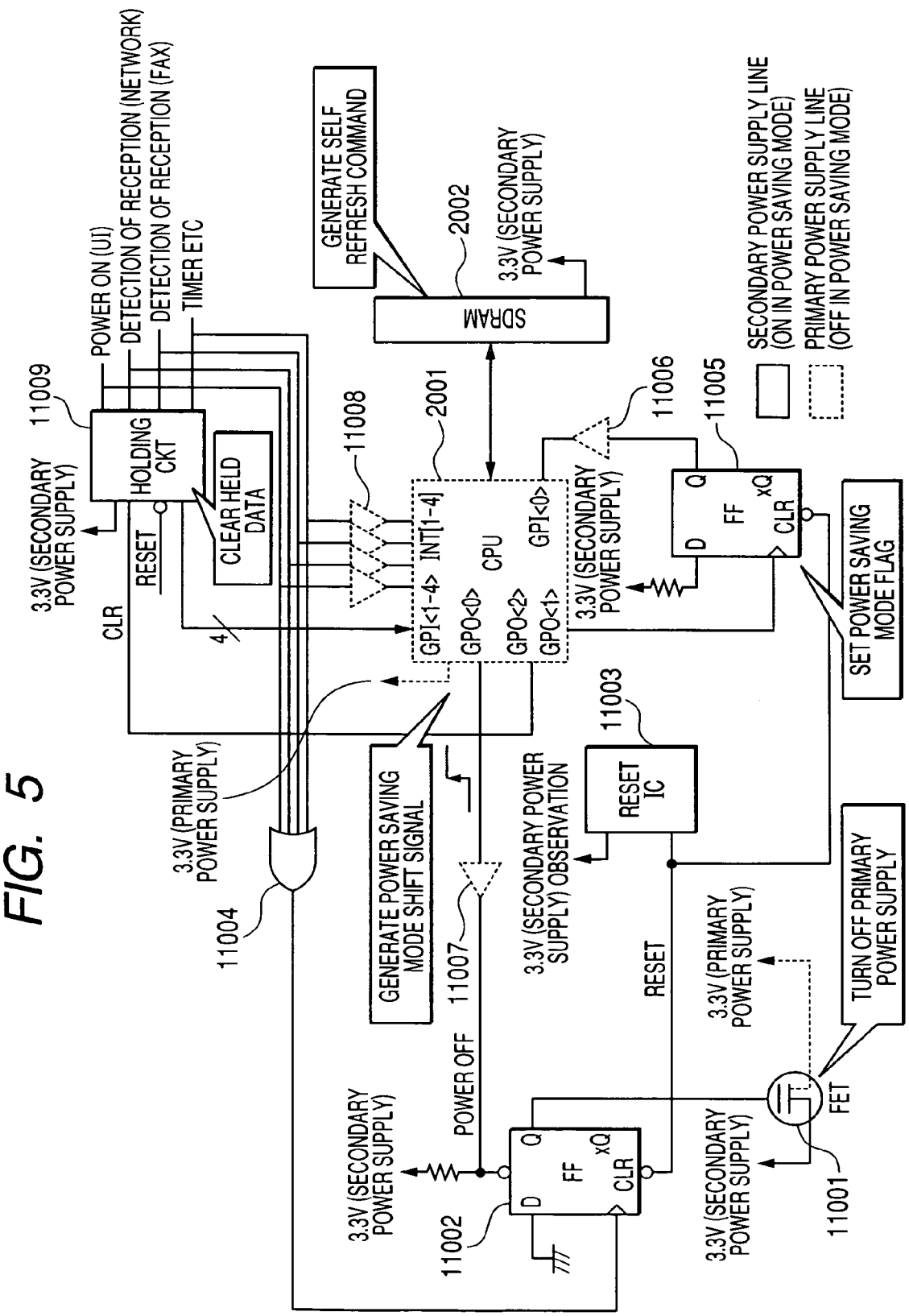
FIG. 5 is a circuit diagram for explaining structure of a power supply control unit in a controller unit shown in FIG. 1.
Figure 6:
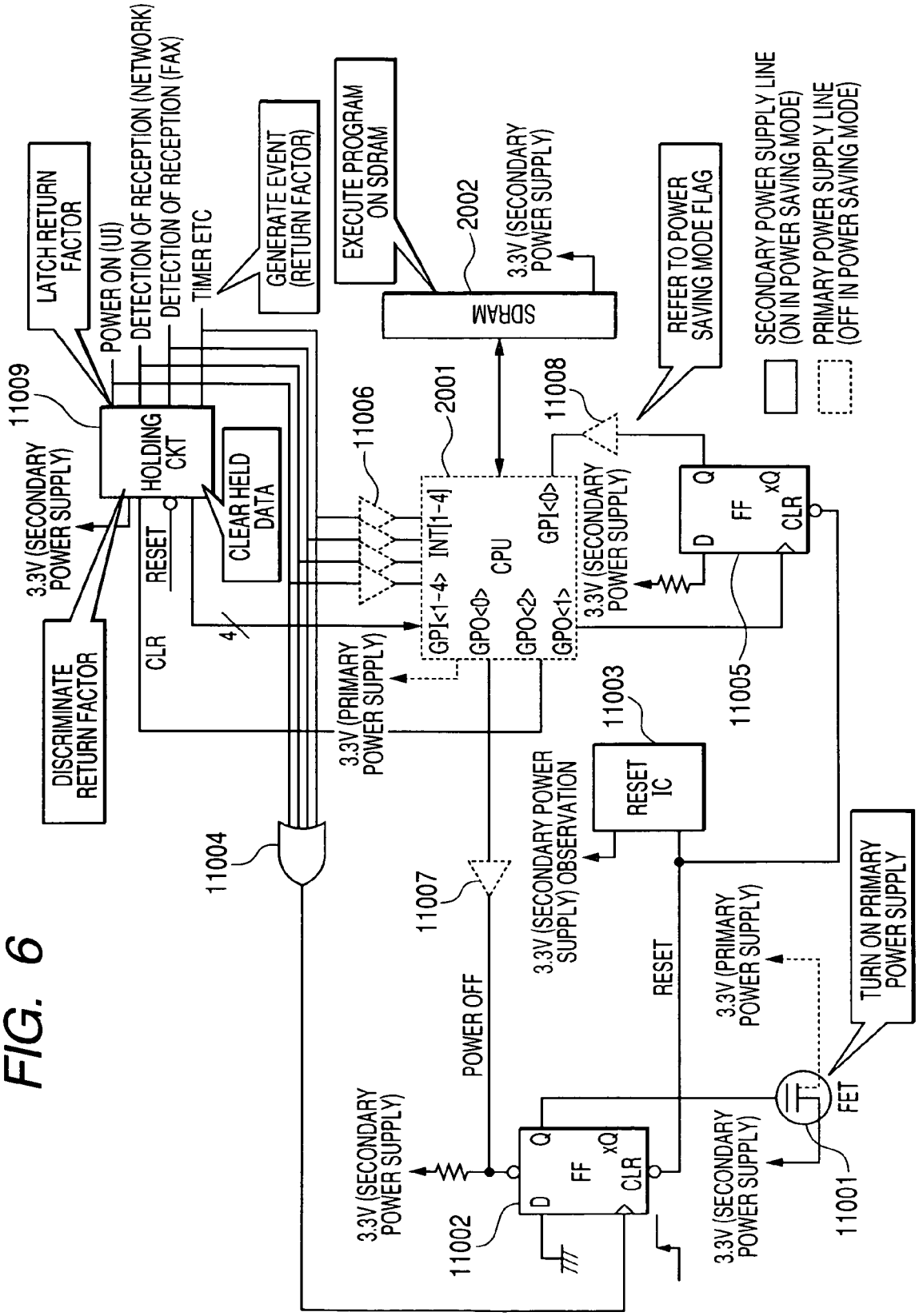
FIG. 6 is a circuit diagram for explaining the structure of the power supply control unit in the controller unit shown in FIG. 1.
Figure 7:
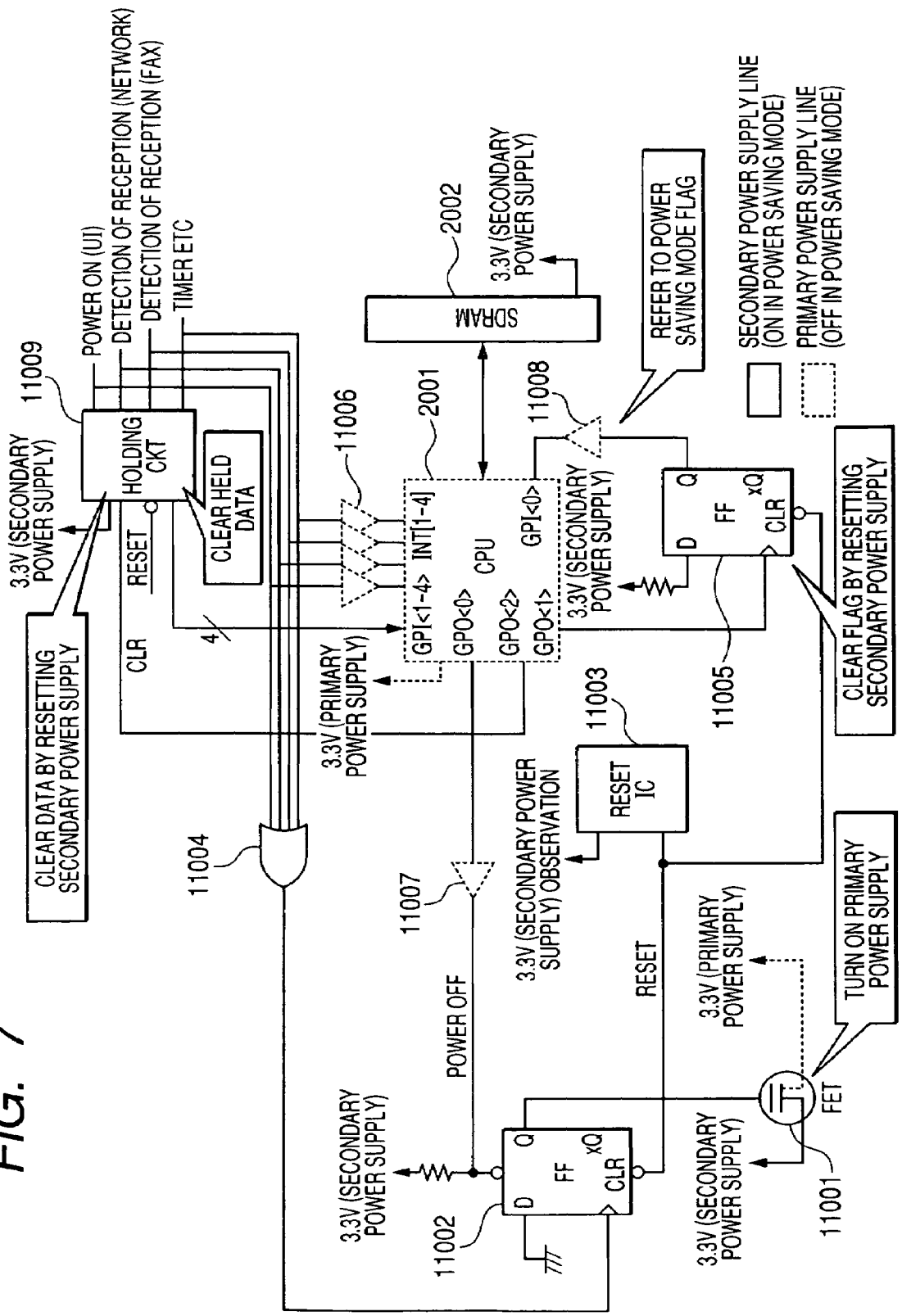
FIG. 7 is a circuit diagram for explaining the structure of the power supply control unit in the controller unit shown in FIG. 1.

FIGS. 5, 6 and 7 are circuit diagrams for explaining structure of a power supply control unit 2052 in the CU 2000 shown in FIG. 1. In FIGS. 5, 6 and 7, the same portions as those in FIG. 1 are denoted by the same reference numerals. An operation to be executed in FIG. 5 corresponds to an operation that the multiplex devices 1001 and 1020 shift to the power saving mode from the print mode. An operation to be executed in FIG. 6 corresponds to an operation that the multiplex devices 1001 and 1020 return to the print mode from the power saving mode. An operation to be executed in FIG. 7 corresponds to an operation after turning ON a main power switch (not shown) used for supplying the power to the multiplex devices 1001 and 1020 from the commercial power supply. In FIGS. 5, 6 and 7, portions denoted by broken lines belong to a primary power supply line (a non-overnight power supply line), to which the power is supplied from the power supply control unit 2052 in the print mode, however the power is not supplied in the power saving mode. Portions denoted by actual lines belong to a secondary power supply line (an overnight power supply line), to which the power is supplied also in the print mode and the power saving mode.

In FIG. 5, reference numeral 11001 denotes an FET (Field Effect Transistor) of which a gate side is applied by an output from a terminal Q of an FF (Flip Flop) circuit 11002, and the FET is obliged to execute the role of separating the secondary power supply line from the primary power supply line on the basis of condition of the output from the terminal Q. In this manner, the secondary power supply line is separated from the primary power supply line, then in case of shifting to the power saving mode, the power supplying to portions other than main portions (necessary portions to operate the multiplex devices 1001 and 1020 under the power saving mode) in the CU 2000 is shut off, thereby becoming possible to suppress the useless standby power. The SDRAM 2002 and the ROM 2003 shown in FIG. 1 belong to the secondary power supply line, and the CPU 2001, the HDD 2004, the image bus I/F unit 2005, the RIP unit 2060, the device I/F unit 2020, the scanner image processing unit 2080, the printer image processing unit 2090, the image rotation unit 2030 and the image compression unit 2040 shown in FIG. 1 belong to the primary power supply line.

A part of the operation unit I/F 2006, the network unit 2010 and the MODEM unit 2050 belongs to the primary power supply line, and another part of those units belongs to the secondary power supply line. The network unit 2010 and the MODEM unit 2050 become a non-receivable state incapable of executing a reception process of image data (PDL data or facsimile data) which is input from the LAN or WAN when the multiplex device 1001 (1020) is operating under the power saving mode. On the other hand, the network unit 2010 and the MODEM unit 2050 can receive a reception request, which is input from the LAN or WAN, used for returning the multiplex device 1001 (1020) to the print mode from the power saving mode.

Reference numeral 11009 denotes a holding circuit, which belongs to the secondary power supply line and is structured that first to fourth request instructions for releasing the power saving mode can be accepted during the power saving mode. The first to fourth request instructions are input to a clock input terminal of the FF circuit 11002 through a logic OR gate 11004. The first to fourth request instructions being factors of returning the multiplex devices 1001 and 1020 to the print mode from the power saving mode are input to the CPU 2001 through a buffer group 11008.

It is structured that the first to fourth request instructions to be held in the holding circuit 11009 are held by converting into, for example, four-bit data, which is read in a case that a flag value set in an FF (Flip Flop) circuit 11005 indicates "1" when the CPU 2001 returns to the print mode from the power saving mode, and contents of the first to fourth request instructions can be judged by referring to a previously corresponded bit judgment table.

In the present embodiment, the first request instruction corresponds to a power-on instruction for the multiplex device by a user to be input from the operation unit 2012 through the operation unit I/F 2006. The power-on instruction is an instruction used for shifting an operation condition of the multiplex devices 1001 and 1020 which are operating under the power saving mode to the print mode (operating state).

The second request instruction corresponds to a power-on instruction in a case that a reception request of the image data (PDL data) is input from an external device through the network unit 2010. The third request instruction corresponds to a power-on instruction in a case that a reception request of the image data (facsimile data) is input from the external device through the MODEM unit 2050. The fourth request instruction corresponds to a power-on instruction in case of measuring a set time set by a timer (functions as time measuring means) which is not shown.

The FF circuit 11005, which belongs to the secondary power supply line, holds the contents of a flag created by altering a state of a general-purpose output port GPO <1> of the CPU 2001 from "L" state to "H" state also after the multiplex devices 1001 and 1020 shifted to the power saving mode from the print mode. Further, the FF circuit 11005 outputs a signal indicating that a reset signal from a reset IC 11003 which belongs to the secondary power supply line is applied to a clear terminal (CLR) to a general-purpose input port GPI <0> of the CPU 2001 from the output terminal Q through a buffer 11006.

The reset IC 11003, which belongs to the secondary power supply line, outputs the reset signal to the FF circuit 11002 which belongs to the secondary power supply line. A buffer 11007 outputs a power-off signal to the FF circuit 11002.

The buffer group 11008, the buffer 11007 and the buffer 11006, which belong to the primary power supply line, prevent to flow the current into the CPU 2001 when shifting to the power saving mode from the print mode.

The reset IC 11003, which observes the secondary power supply line, executes the role of clearing the flag of the FF circuit 11005 and latch data of the holding circuit 11009 at a time of the startup after switching off a main power supply to be described later. The logic OR gate 11004 collects the factors for returning from the power saving mode.

A feature of the present embodiment is found in a point that the CPU 2001 generally weighted in consuming the power is constituted to belong to the primary power supply line in the CU 2000 in order to prevent to supply the power to the CPU 2001 in the power saving mode. Another feature is found in a point that the holding circuit 11009 holds information what factor is input among plural factors of causing to shift to the print mode from the power saving mode in the multiplex devices 1001 and 1020 which operate with at least two operation modes of the power saving mode and the print mode (plural modes different in consuming the power may be further provided in the power saving mode).

Since the present system controls various functions as above mentioned and the software has extremely large capacity, only the information required in a boot operation (initialization) is stored in the ROM 2003 for the purpose of reducing total costs of the system, and the software describing actual main operations is stored in the HDD 2004 which is mainly used for storing image data.

Therefore, when a start process of the main power is ordinary executed, a main program is executed after downloading the large capacity main program on the HDD 2004 into the SDRAM 2002 (in the present embodiment, the SDRAM is used). However, in this case, since the time is taken until a start of executing the main program, there is possibility of interrupting communication in time-out owing to a startup factor from the exterior such as a network, a facsimile or the like.

In the most of recent multiplex devices, a startup time itself becomes a selling point in specifications. From this viewpoint, it becomes to be required to contrive to shorten the startup time. In order to solve this problem, in the present embodiment, controls described in the following are executed by using a low-priced logic circuit (FF 11002, FF 11005 or the like).

Hereinafter, a process of shifting the multiplex device 1001 (1020) to the power saving mode from the print mode will be explained with reference to a flow chart shown in FIG. 8.

Figure 8:
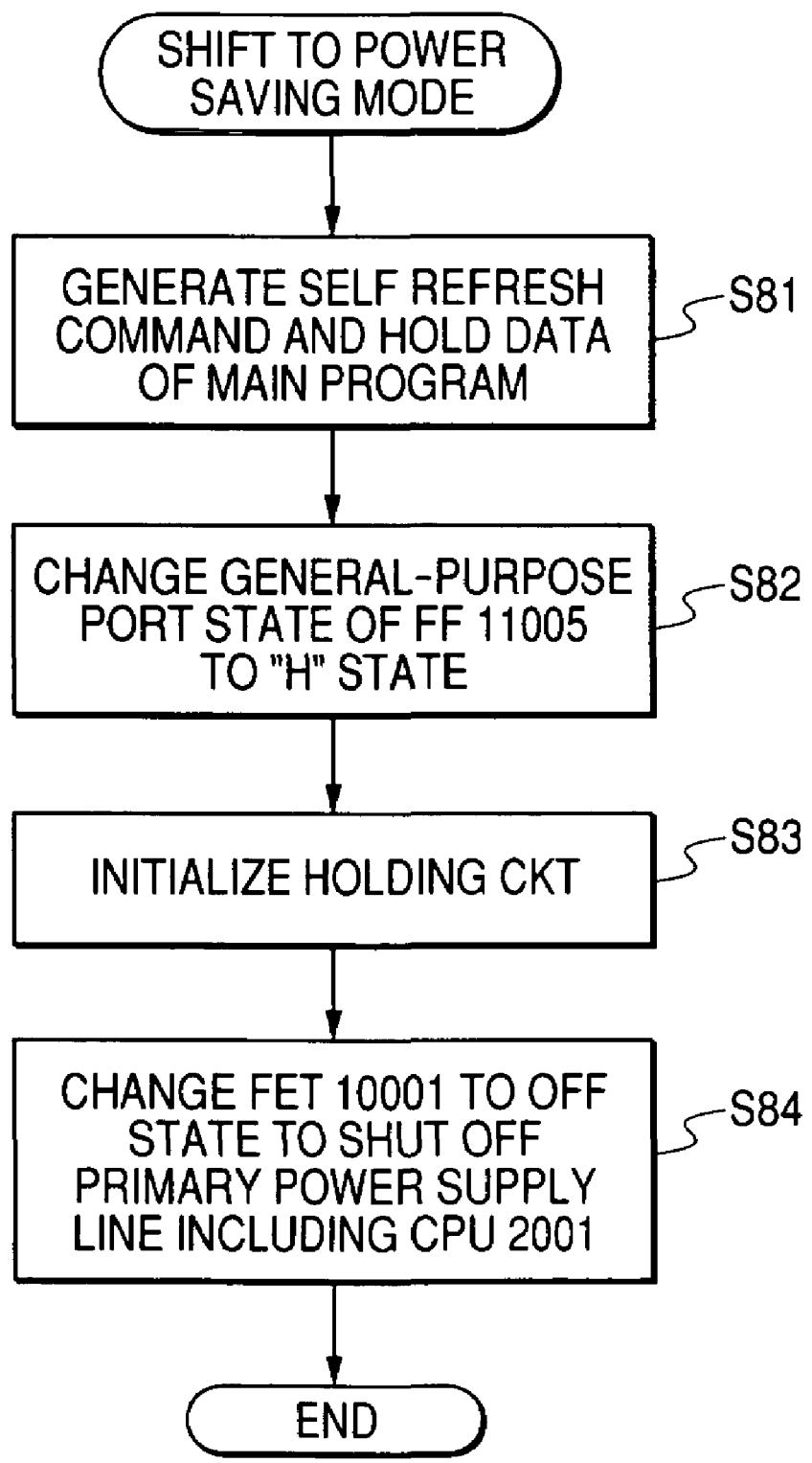
FIG. 8 is a flow chart showing an example of a first data processing procedure in a multiplex device (image processing device)

FIG. 8 is the flow chart showing an example of a first data processing procedure in the multiplex device (image processing device) according to the present embodiment, and this flow chart corresponds to a processing procedure of shifting the multiplex device to the power saving mode from the print mode. Reference symbols S81 to S84 denote respective steps.

Initially, in the step S81, in a case that the shift to the power saving mode is designated by depressing a power saving key 2019 on the operation unit 2012 by a user, or in a case that a fixed time has been elapsed under a state that the multiplex device does not process any data, the CPU 2001 in the multiplex device 1001 (1020) judges that a condition to shift to the power saving mode is satisfied. Then, the CPU 2001 generates a self refresh command to the SDRAM 2002 and sets to hold the main program held in the SDRAM 2002 continuously.

Next, in the step S82, as a means for storing information of shifted to the power saving mode, the CPU 2001 executes a flag set (an output from the FF circuit 11005 is equal to "1") for the FF circuit 11005 by changing a state of the general-purpose output port GPO <1> from "L" state to "H" state.

Since the FF circuit 11005 belongs to the secondary power supply line, the flag holds the value also after shifting to the power saving mode.

Next, in the step S83, the CPU 2001 changes a state of a general-purpose output port GPO <2> for the holding circuit 11009, and data latched in the holding circuit is cleared by initializing the holding circuit 11009.

Next, in the step S84, the CPU 2001 changes a state of a general-purpose output port GPO <0> for the FF circuit 11002 and shifts the FET 11001 to an OFF state under the condition that the output from the terminal Q of the FF circuit 11002 becomes "L" state by presetting an output from the FF 11002 to "H" state, and the primary power supply line including the CPU 2001 is shut off, thereby shifting to the power saving mode.

The buffer group 11008, the buffer 11007 and the buffer 11006 shown in FIG. 5, which are driven by the primary power supply line, execute the role of preventing the flow of the current from the secondary power supply line when shifting to the power saving mode.

The reset IC 11003, which observes the secondary power supply line, executes the role of clearing the flag of the FF circuit 11005 and latch data of the holding circuit 11009 at a time of the start process after switching off the main power supply to be described later. The logic OR gate 11004 collects the factors for returning from the power saving mode, and when any one of the factors is detected, a return request is input to a clock input terminal of the FF circuit 11002.

Hereinafter, a process of returning to the print mode from the power saving mode will be explained with reference to a flow chart shown in FIG. 9.

Figure 9:
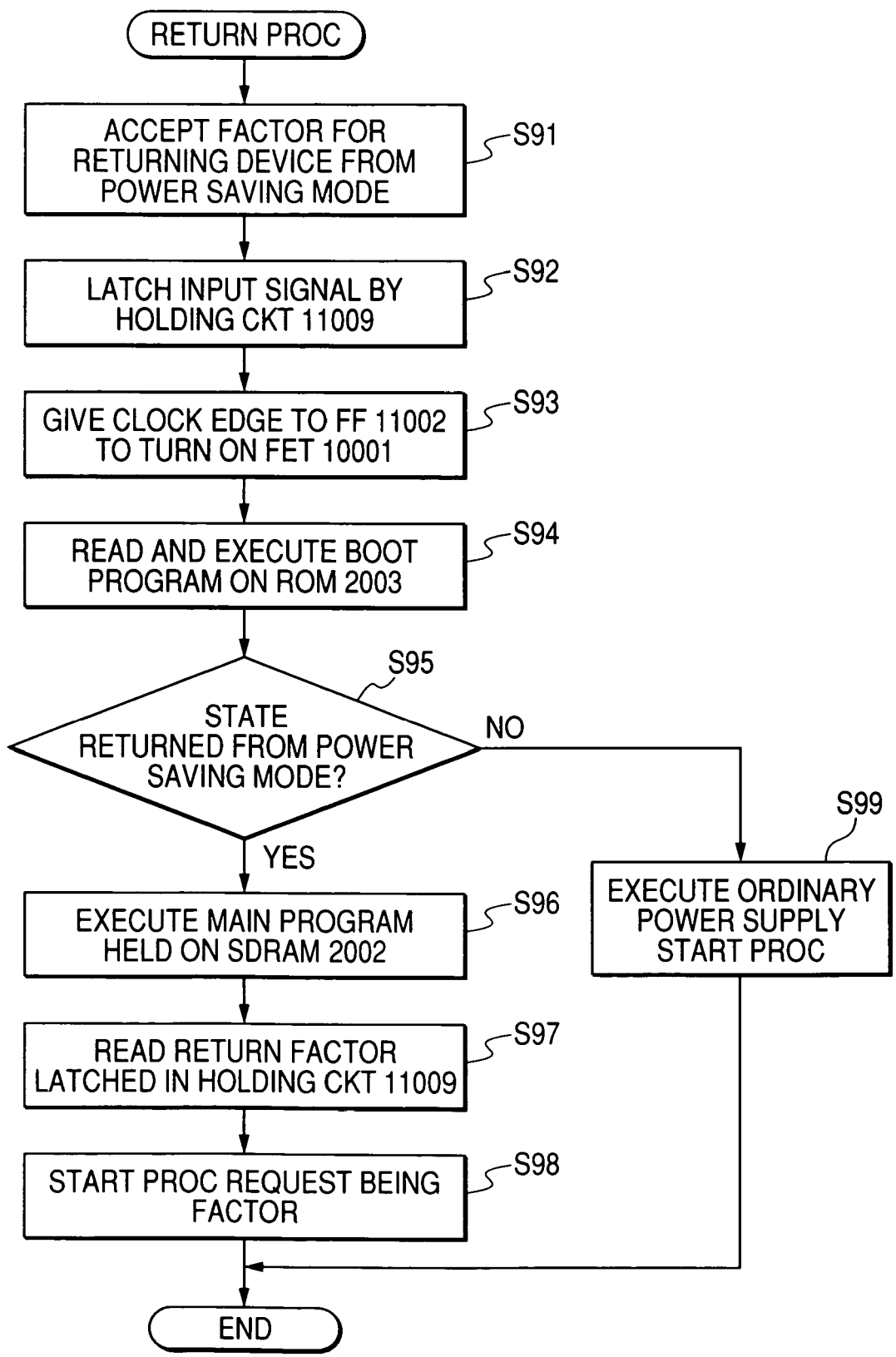
FIG. 9 is a flow chart showing an example of a second data processing procedure in the multiplex device (image processing device)

FIG. 9 is the flow chart showing an example of a second data processing procedure in the multiplex device (image processing device) according to the present embodiment, and this flow chart corresponds to a processing procedure when the multiplex device (image processing device) returns to the print mode from the power saving mode. Reference symbols S91 to S99 denote respective steps.

Initially, in the step S91, the factors (first to fourth request instructions) for returning the multiplex device from the power saving mode to the print mode are input when the multiplex device is operating under the power saving mode.

Next, in the step S92, by inputting any one of the plural factors, the holding circuit 11009 latches a signal which was input and makes preparations for enabling to read data when the CPU 2001 is returned to the print mode. Data to be latched by the holding circuit 11009 is held until the main power supply (not shown) of the multiplex device 1001 (1020) is switched OFF or a clear signal clr is input to the holding circuit 11009 from the CPU 2001.

Then, in the step S93, the holding circuit, to which the return factors are input, is also connected to the FF circuit 11002 through the logic OR gate 11004, and when the factor for returning to the print mode from the power saving mode is generated, a clock edge is given to the FF circuit 11002 and the FET 11001 is turned ON, then the primary power supply line is activated and a return process of returning to the print mode from the power saving mode is started.

Then, in the step S94, when it is started to supply the power to the primary power supply line, the CPU 2001 reads a boot program from the ROM 2003 to execute the boot program. When executing the boot program, the CPU 2001 refers to a flag value stored in the FF circuit 11005 from the general-purpose input port GPI <0> of the CPU 2001.

In the step S95, the CPU 2001 judges from the flag stored in the FF circuit 11005 whether or not it was in a state of returning from the power saving mode. When it was in a state of returning from the power saving mode, since the flag value stored in the FF circuit 11005 is equal to "1", the CPU 2001 judges that it was in a state of returning from the power saving mode (YES). When the CPU 2001 makes the judgment of "YES" in the step S95, a flow advances to the step S96, where a main program being a base of a startup sequence held in the SDRAM 2002 is executed. When it was not in a state of returning from the power saving mode but in a state of switching ON a main power supply of the multiplex device 1001 (1020), since the flag value stored in the FF circuit 11005 is equal to "0", the CPU 2001 judges that it is in a state of switching ON the main power supply. When the CPU 2001 makes the judgment of "NO" in the step S95, the flow advances to the step S99, where a power supply start process to be described later is executed and then the present process is terminated.

Then, in the step S97, the CPU 20001 reads the return factors latched in the holding circuit 11009 and judges what instruction among the first to fourth request instructions is generated as the return factor. In the step S98, the CPU 2001 executes a start process of portions (the operation unit I/F 2006, the network unit 2010, the MODEM unit 2050 or the timer) being the return factor of returning from the power saving mode. For example, the CPU 2001 executes the start process so as to shift the network unit 2010 from a state incapable of receiving the image data (PDL data) to a state capable of receiving the image data, in a case that the return factor of returning to the print mode from the power saving mode is an input of a reception request to the network unit 2010. Further, for example, the CPU 2001 executes the start process so as to shift the MODEM unit 2050 from a state incapable of receiving the image data (facsimile data) to a state capable of receiving the image data, in a case that the return factor of returning to the print mode from the power saving mode is an input of a reception request to the MODEM unit 2050.

Figure 12:
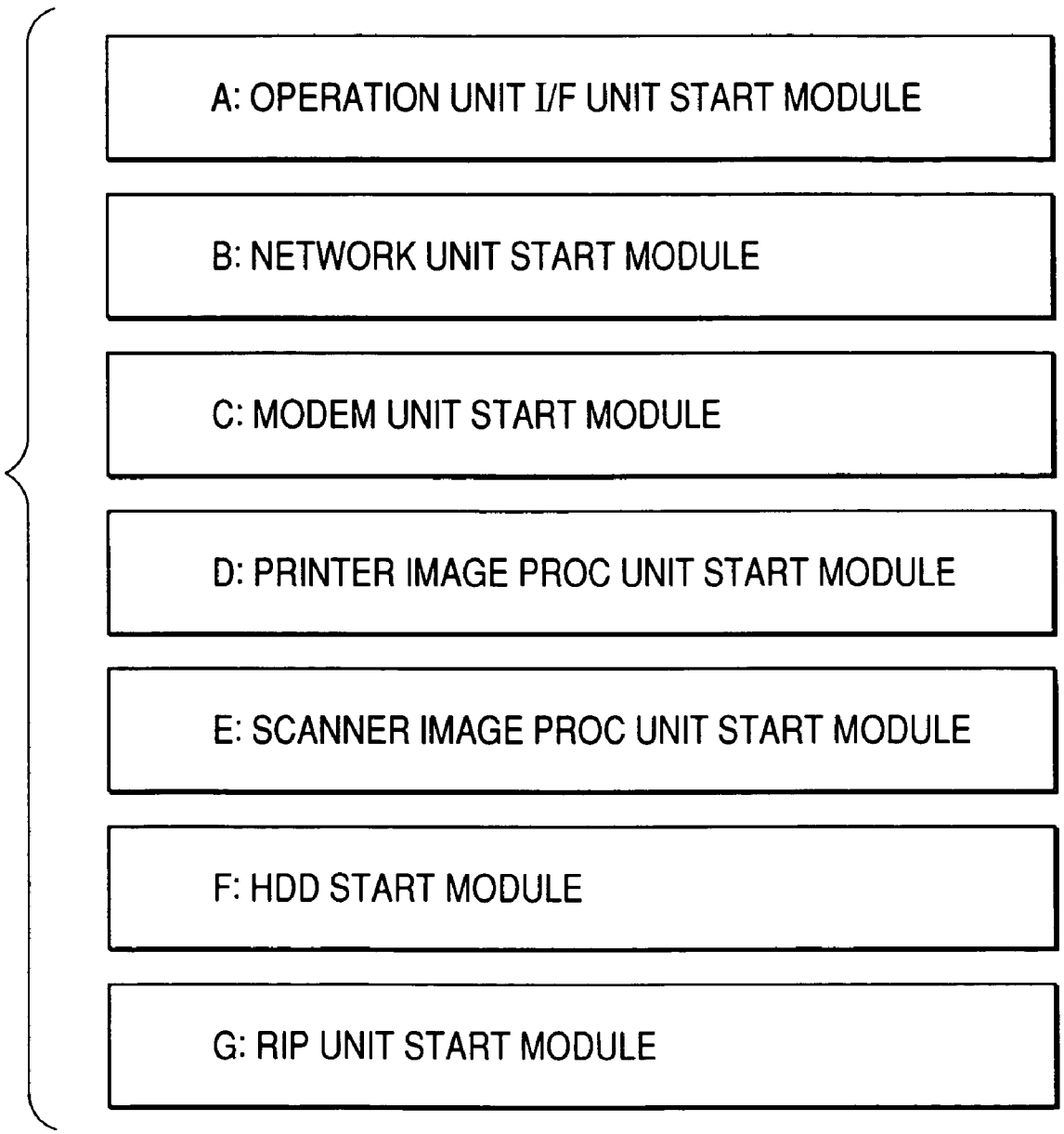
FIG. 12 is a view showing modules of a boot program to be executed by a CPU 2001.

FIG. 12 is a view showing modules of a boot program to be executed by the CPU 2001, and the boot program is constituted by plural program modules A to G. When the main power supply of the multiplex device 1001 (1020) is switched ON, the CPU 2001 of the multiplex device 1001 (1020) sequentially executes a start process of the plural function units (the operation I/F unit 2006, the network unit 2010, the MODEM unit 2050, the RIP unit 2060, the scanner image processing unit 2080 and the printer image processing unit 2090) included in the CU 2000 in order of A to G shown in FIG. 12.

Figure 13:
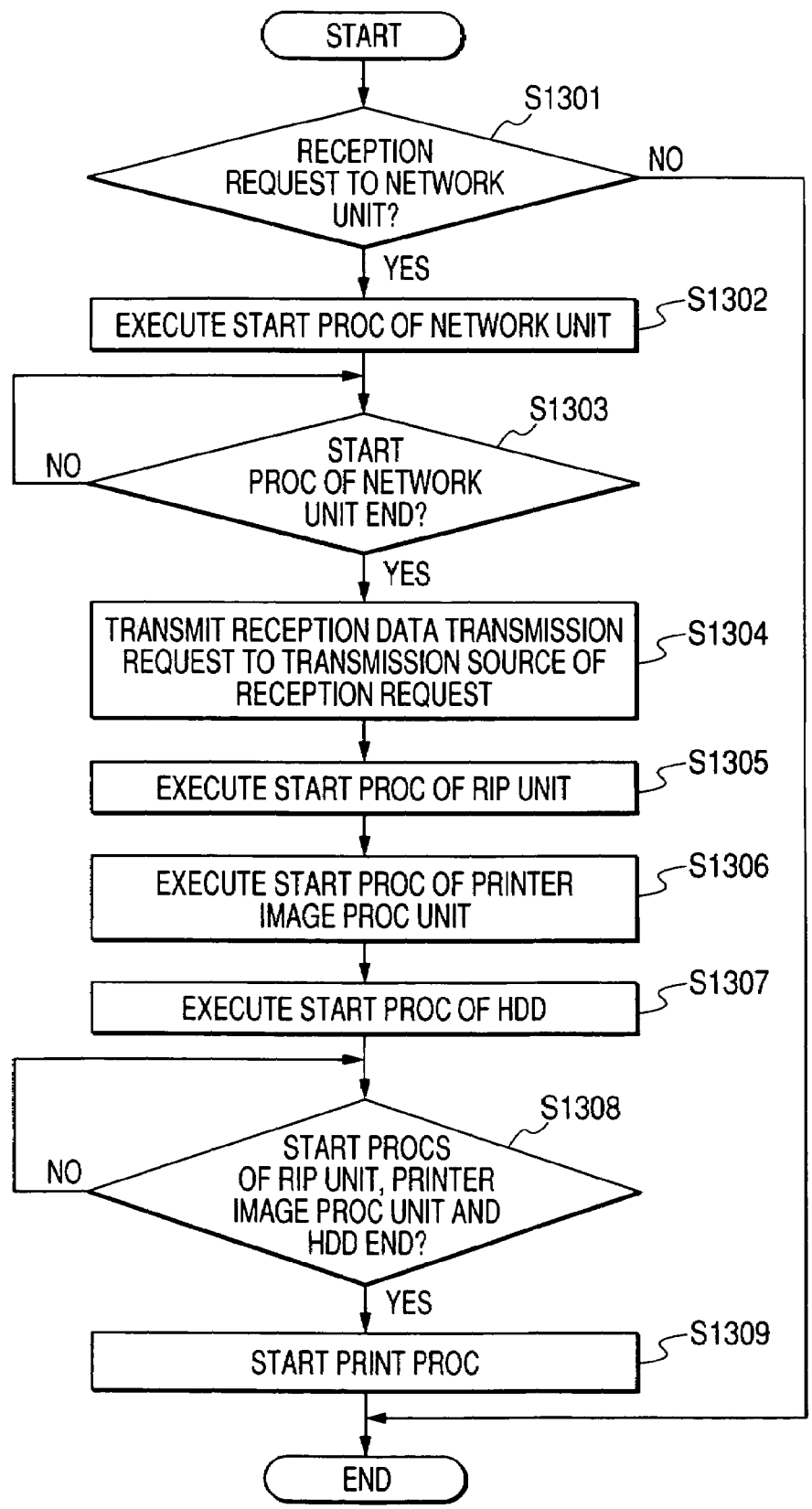
FIG. 13 is a flow chart showing an operation in a case that a reception request is input to a network unit 2010.

On the other hand, in a case that the multiplex device 1001 (1020) returns to the print mode from the power saving mode, the CPU 2001 executes the program formed into modules A to G in different order as compared with a case that the main power supply is switched ON. Concretely, the CPU 2001 executes the program formed into modules A to G in order according to the return factors of returning to the print mode from the power saving mode. Here, an operation to be executed by the CPU 2001 in a case that the return factor of returning to the print mode from the power saving mode is an input of a reception request to the network unit 2010 will be explained with reference to FIG. 13. A process shown in FIG. 13 is to be executed by the CPU 2001 and corresponds to an operation in the step S98 shown in FIG. 9.

In a step S1301, the CPU 2001 judges whether or not the return factor which was read in the step S97 shown in FIG. 9 is the reception request to the network unit 2010. If it is the reception request to the network unit 2010, a flow advances to a step S1302, and if it is not the reception request to the network unit 2010, the flow is terminated.

In the step S1302, the CPU 2001 executes a start process of the network unit 2010 by executing the program module B.

In a step S1303, the CPU 2001 judges whether or not the start process of the network unit 2010 is terminated by execution of the program module B, and if the start process is terminated, the flow advances to a step S1304.

In the step S1304, the CPU 2001 transmits a transmission request used for transmitting the image data (PDL data) to an information processing terminal connected to the LAN through which the reception request was transmitted to the network unit 2010. It is assumed that the transmission request is transmitted by using specific information such as an IP address or the like used for specifying the information processing terminal. The specific information such as the IP address or the like used for specifying the information processing terminal may be stored in a storage unit (not shown) which belongs to the secondary power supply line in accordance with a fact that the return factor was input to the network unit 2010. In the step S1304, when the transmission request of the image data is transmitted to the information processing terminal, since the image data (PDL data) is input to the network unit 2010 from the information processing terminal, the network unit 2010 starts a reception process of the image data.

In steps S1305 to S1307, the CPU 2001 sequentially executes the program modules G, D and F in order to execute an image process and an image formation process on the basis of the image data (PDL data) received by the network unit 2010. The program module G, which is a module used for executing a start process of the RIP unit 2060, executes the start process of the RIP unit 2060 in order to execute the image process based on the image data received by the network unit 2010. The program module D, which is a module used for executing a start process of the printer image processing unit 2090, executes the start process of the printer image processing unit 2090 in order to execute the image process based on the image data received by the network unit 2010. The program module F, which is a module used for executing a start process of the HDD 2004, executes the start process of the HDD 2004 in order to execute the image process based on the image data received by the HDD 2004. With respect to the program modules G, D and F, they are not always executed in order of G, D and F but may be executed in arbitrary order.

In a step S1308, the CPU 2001 judges whether or not the start processes of the RIP unit 2060, the printer image processing unit 2090 and the HDD unit 2004, of which the start processes were executed in the steps S1305 to S1307, are terminated. And, if it is terminated, the flow advances to a step S1309.

In the step S1309, the CPU 2001 controls to store the image data (PDL data), which was received from the information processing terminal through the network unit 2010, into the HDD 2004 after converting the image data into bit map image data in the RIP unit 2060 and further controls to cause the printer image processing unit 2090 to execute an image process for the bit map image data and then the processed data is transmitted to the printer 2095. The printer 2095, which received the image processed image data, starts a print process of forming an image on a sheet on the basis of the image data. The CPU 2001 is allowed to execute the program modules, which are used for starting the function units (the operation unit I/F 2006, the MODEM unit 2050, the scanner unit 2070 and the scanner image processing unit 2080) which are not concerned with the image process and the image formation process (printer process) of the image data received by the network unit 2010, in steps after the step S1308. In this manner, with respect to execution order of the program modules A to G, the CPU 2001 hastens execution order of the program module concerning with the return factor of returning to the print mode from the power saving mode, thereby shortening a time elapsed until the start of a process concerning with the return factor.

Figure 14:
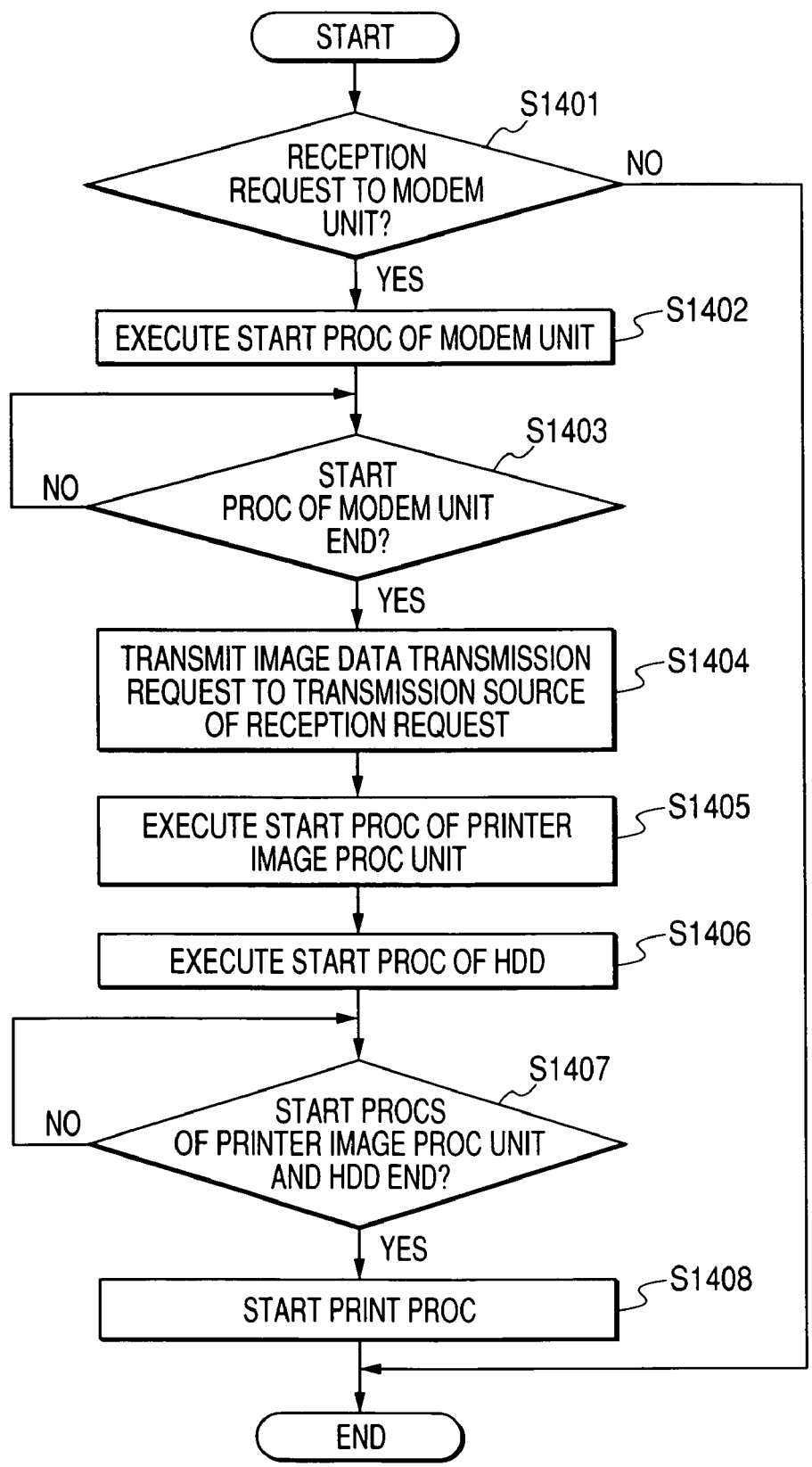
FIG. 14 is a flow chart showing an operation in a case that the reception request is input to a MODEM unit 2050.

Next, an operation to be executed by the CPU 2001 in a case that the return factor of returning to the print mode from the power saving mode is an input of a reception request to the MODEM unit 2050 will be explained with reference to FIG. 14. A process shown in FIG. 14 is to be executed by the CPU 2001 and corresponds to an operation in the step S98 shown in FIG. 9.

In a step S1401, the CPU 2001 judges whether or not the return factor which was read in the step S97 in FIG. 9 is the reception request to the MODEM unit 2050. If it is the reception request to the MODEM unit 2050, a flow advances to a step S1402, and if it is not the reception request to the MODEM unit 2050, the flow is terminated.

In the step S1402, the CPU 2001 executes a start process of the MODEM unit 2050 by executing a start process of the program module C.

In a step S1403, the CPU 2001 judges whether or not the start process of the MODEM unit 2050 is terminated by execution of the program module C, and if the start process is terminated, the flow advances to a step S1404.

In the step S1404, the CPU 2001 transmits a transmission request used for transmitting the image data (facsimile data) to the information processing terminal connected to the LAN through which the reception request was transmitted to the MODEM unit 2050. It is assumed that the transmission request is transmitted by using specific information such as a facsimile number or the like used for specifying a facsimile terminal. The specific information such as the facsimile number or the like used for specifying the facsimile terminal may be stored in the storage unit (not shown) which belongs to the secondary power supply line in accordance with a fact that the return factor was input to the MODEM unit 2050. In the step S1404, when the transmission request of the image data is transmitted to the facsimile terminal, since the image data (facsimile data) is input to the MODEM unit 2050 from the facsimile terminal, the MODEM unit 2050 starts a reception process of the image data.

In steps S1405 and S1406, the CPU 2001 sequentially executes the program modules D and F in order to execute an image process and an image formation process on the basis of the image data (facsimile data) received by the MODEM unit 2050. The program module D, which is a module used for executing the start process of the printer image processing unit 209Q, executes the start process of the printer image processing unit 2090 in order to execute the image process based on the image data received by the network unit 2010. The program module F, which is a module used for executing the start process of the HDD 2004, executes the start process of the HDD 2004 in order to execute the image process based on the image data received by the HDD 2004. With respect to the program modules D and F, they are not always executed in order of D and F but may be executed in arbitrary order.

In a step S1407, the CPU 2001 judges whether or not the start processes of the printer image processing unit 2090 and the HDD unit 2004, of which the start processes were executed in the steps S1405 and S1406, are terminated. And, if it is terminated, the flow advances to a step S1408.

In the step S1408, the CPU 2001 controls to cause the printer image processing unit 2090 to execute an image process for the image data (facsimile data) which was received from the information processing terminal through the MODEM unit 2050 and then the processed data is transmitted to the printer 2095. The printer 2095, which received the image processed image data, starts a print process of forming an image on a sheet on the basis of the image data.

The CPU 2001 is allowed to execute the program modules, which are used for starting the function units (the operation unit I/F 2006, the network unit 2010, the scanner unit 2070 and the scanner image processing unit 2080) which are not concerned with the image process and the image formation process (printer process) of the image data received by the network unit 2010, in steps after the step S1407. In this manner, with respect to execution order of the program modules A to G, the CPU 2001 hastens execution order of the program module concerning with the return factor of returning to the print mode from the power saving mode, thereby shortening a time elapsed until the start of a process concerning with the return factor.

Figure 10:
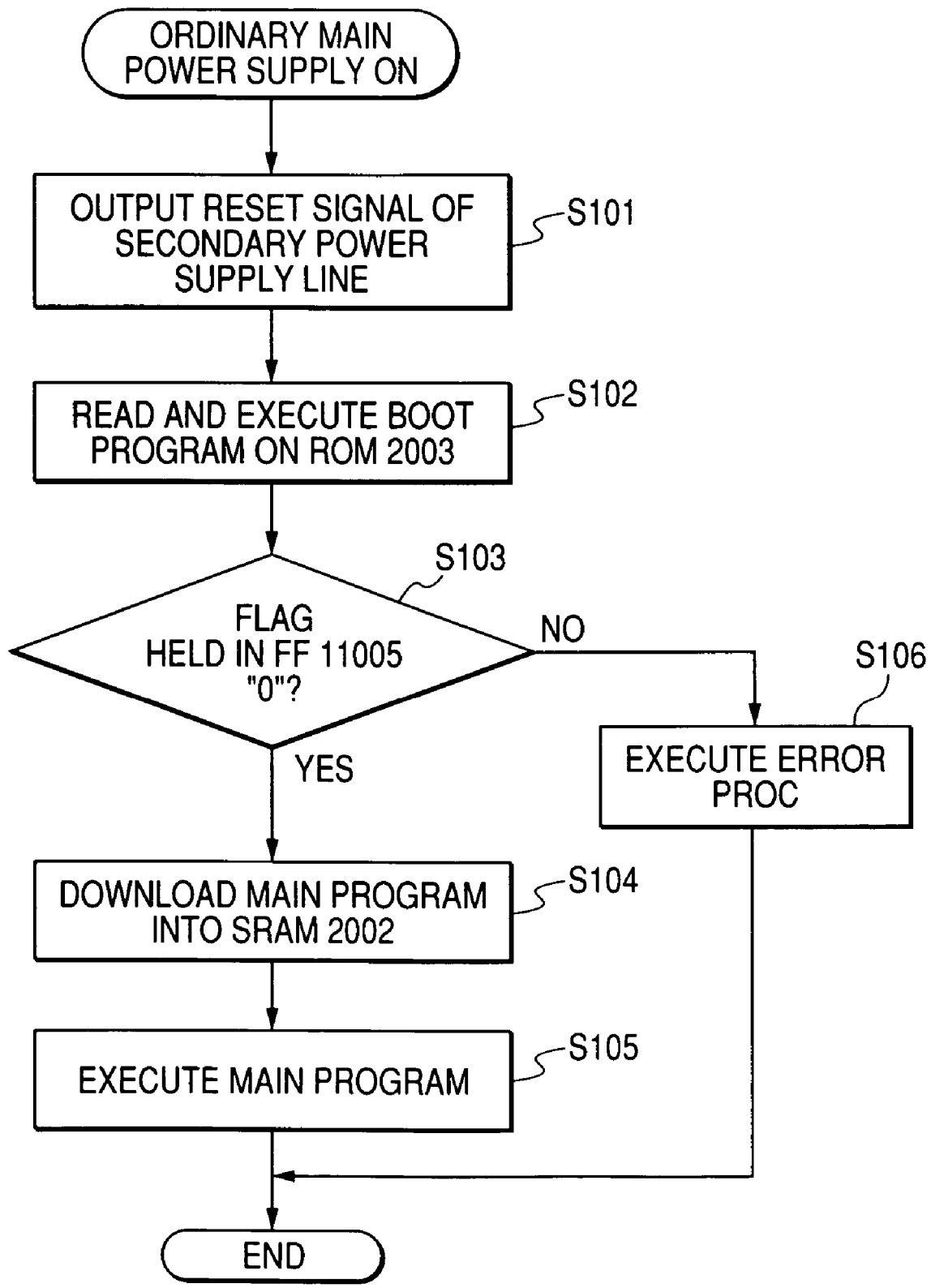
FIG. 10 is a flow chart showing an example of a third data processing procedure in the multiplex device (image processing device)

FIG. 10 is a flow chart showing an example of a third data processing procedure in the multiplex device (image processing device) according to the present embodiment, and processes in this flow chart correspond to operations to be executed after switching ON the main power supply of the multiplex device 1001 (1020). Reference symbols S101 to S106 denote respective steps.

As shown in FIG. 10, operations to be executed by switching ON the main power supply of the multiplex device 1001 (1020) after switching OFF the main power supply of the multiplex device 1001 (1020) by a user, will be explained.

Initially, in the step S101, since the main power supply of the multiplex device 1001 (1020) is switched OFF and ON, a reset signal of the secondary power supply line is output from the reset IC 11003, and when the main power supply is switched ON, hold data in the holding circuit 11009 and the flag held in the FF circuit 11005 are set in a disable state.

Then, in the step S102, when the reset signal of the secondary power supply line is generated from the reset IC 11003, an output of the FF circuit 11002 is cleared to "L" state. Accordingly the FET 11001 is turned ON, and the CPU 2001 executes the boot program on the ROM 2003.

Then, in the step S103, the CPU 2001 judges whether or not the flag value stored in the FF circuit 11005 is equal to "0", and when it is judged that the flag value which was read is equal to "0", it is judged that the main power supply is in a state of switched ON. When the CPU 2001 makes the judgment of "YES" in the step S103, the CPU 2001 does not download the factor into the holding circuit 11009 but downloads a main program of large capacity on the HDD 2004 into the SDRAM 2002 in the step S104. Then, in the step S105, the CPU 2001 executes the main program.

On the other hand, in the step S103, when the CPU 2002 judged that the flag value stored in the FF circuit 11005 is not equal to "0", the CPU 2001 judges that it was in a state of returning from the power saving mode (NO), then a flow advances to the step S106. Because of judgment that it is returned to the print mode from the power saving mode, the CPU 2001 executes a process equivalent to the above-mentioned return process or an error process in the step S106.

In each of FIGS. 5 to 7, although there is a portion described as the CPU, the function of the CPU is also same as that of a SoC (System on Chip) which includes the CPU.

According to the above-mentioned embodiment, in a various data processing system, which includes an image processing system composed of a CPU, a DRAM and a hard disk, having the function of a power saving mode, when the power source, which is to be supplied to the CPU for controlling the above-mentioned system at a time of selecting the power saving mode, is shut off, a main program of the CPU is held on the DRAM when shifting to the power saving mode, and a start process is executed at a high speed by the main program held on the DRAM in case of returning to an ordinary operation mode from the power saving mode. Therefore, the main program writes a flag of intending the power saving mode in a storage medium structured by a low-priced logic, the flag is held also when executing the power saving mode, and the main program refers to a state of the flag stored in the storage medium structured by the low-priced logic when returning from the power saving mode, thereby realizing to judge a return factor at a high speed.

Especially, in the present embodiment, if a power-ON signal from a UI (User Interface), a reception detection signal from a facsimile device, a reception detection signal from the network and the like being the return factors of returning from the power saving mode are generated when it is the power saving mode, those signals are held, and the structure capable of simply discriminating the factors after returning to the ordinary operation mode is provided, thereby realizing a high-speed return of returning from the power saving mode.

With respect to the factors held in the holding circuit, in a case that the power supply of an entire system is shut off or by setting in a state capable of being cleared by the software, a defective start process can be avoided and the more usable hardware can be provided at a time of executing a start process or a debugging process of the software.

The most effective applying example of the structure shown in the present embodiment is exhibited in a case that, for example, when a multi-function printer, which executes a process for a HOOK signal or a CI signal at a time of execution of a facsimile function process, a switching operation of a UI or the like, returns from the power saving mode.

In the hardware structure shown in the above-mentioned FIG. 5 and the like, it is needless to say that the FET, the OR gate or the like can be structured as an equivalent circuit by another chip device.

Second Embodiment

Hereinafter, the structure of a data processing program which can be read by an image processing system according to the present invention will be explained with reference to a memory map shown in FIG. 11.

FIG. 11 is a view for explaining the memory map of a storage medium for storing various data processing programs which can be read by the image processing system according to the present invention.

Although they are not shown, information for managing a program group to be stored in the storage medium, for example, such as version information, information of a writer and the like are also stored, and information depending on an OS (Operating System) at a side of reading out programs, for example, such as an icon for discriminatingly displaying a program and the like are also sometimes stored.

Further, data subordinate to the various programs is managed by the above-mentioned directory. In a case that a program used for installing the various programs into a computer or a program to be installed is compressed, a program used for extraction is also sometimes stored.

Functions shown in FIGS. 8 to 10 in the present embodiment may be executed by a host computer according to a program installed from an external device. In this case, the present invention is applicable in a case that an information group including programs is supplied to an output device by a storage medium such as a CD-ROM, a flash memory, an FD (floppy disk) or the like, or from an external storage medium through a network. As mentioned above, it is needless to say that an object of the present invention can be achieved in a case where a storage medium recording the program codes of software for realizing the functions of the above-mentioned embodiments is supplied to a system or an device and then a computer (or CPU or MPU) in the system or the device reads and executes the program codes stored in the storage medium.

In this case, the program codes themselves read from the storage medium realize the new functions of the present invention, and the storage medium storing such the program codes constitutes the present invention.

Therefore, any form of a program, such as an object code, a program executed by an interpreter, script data to be supplied to an OS or the like is available without inquiring a program form if having the function of a program.

AS the storage medium for supplying the programs, for example, a flexible disk, a hard disk, an optical disk, a magnetooptical disk, an MO, a CD-ROM, a CD-R, a CD-RW, a magnetic tape, a nonvolatile memory card, a ROM, a DVD or the like can be used.

In this case, the program codes themselves read from the storage medium realize the functions of the above-mentioned embodiments, and the storage medium storing such the program codes constitutes the present invention.

As another method of supplying the programs, which can be also supplied by downloading the computer program itself of the present invention or a file which is compressed and includes automatic installing function into the storage medium such as a hard disk or the like from a homepage by connecting to the homepage on an internet by using browser of a client computer. Further, the supplying of the programs can be also realized by dividing program codes constituting the program of the present invention into a plurality of files and downloading the respective files from different homepages. That is, a WWW server, a ftp (file transfer protocol) server or the like, which makes the plural users to download program files for realizing the functional process of the present invention by the computer, is also included in appended claims of the present invention.

The programs of the present invention which are encoded and stored in the storage media such as the CD-ROMs or the like are distributed to users, and key-information for solving the encoded program is made to be downloaded for the specific user who clears a predetermined condition from the homepage through the internet, and that user executes the encoded program by using the key-information to install the program into the computer. Thereby, the supplying of the programs can be also realized.

It is needless to say that the present invention also includes not only a case where the functions of the above-mentioned embodiments are realized by the execution of the program codes read by the computer, but also a case where an OS (operating system) or the like functioning on the computer executes all the process or a part thereof according to the instructions of the program codes, thereby realizing the functions of the above-mentioned embodiments.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above-mentioned embodiments.

The present invention is not limited to the above-mentioned embodiments, but can be modified in various manners (including an organic combination of embodiments) on the basis of the spirit of the present invention, and the various modifications are not excluded from the scope of the present invention.

Although various samples and embodiments have been indicated and explained, the spirit and scope of the present invention are not limited to a specific explanation in the present specifications for the person skilled in the art.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-228870 filed Aug. 5, 2004, which is hereby incorporated by reference herein.

What is claimed is:

1. A data processing device which executes data processing based on input data and operates in either a power-saving state or an operating state, comprising:

plural reception units, including a first reception unit and a second reception unit, adapted to receive the data, said plural reception units being in a first reception state in the case where said data processing device operates in the power-saving state and being in a second reception state in the case where said data processing device operates in the operating state;

a data processing unit adapted to execute data processing based on the data received by said reception unit;

a holding unit adapted to, in a case where a reception request of the data is input to either one of said plural reception units being in the power-saving state, hold reception factor information indicating which of said reception units receives the reception request; and a control unit adapted to execute control so as to shift the state of said first reception unit indicated by the reception factor information from the first reception state to the second reception state, and so as to, after starting the shift of the state of said first reception unit, start the shift of the state of said second reception unit from the first reception state to the second reception state, wherein said first reception unit requests a request source of the reception request to transmit the image data according to the shift of the state to the receivable second operating state, and receives the data transmitted in response to the request, and said data processing unit executes the data processing based on the data received by said first reception unit.

2. A data processing device according to claim 1, wherein at least one of said plural reception units receives the data transmitted from an external device through a network.

3. A data processing device according to claim 1, wherein at least one of said plural reception units receives facsimile data transmitted from an external device through a public network.

4. A data processing device which executes data processing based on input data and operates in either a power-saving state or an operating state, comprising:

plural reception units, including a first reception unit and a second reception unit, adapted to receive the data, said plural reception units being in a first reception state in the case where said data processing device operates in the power-saving state and being in a second reception state in the case where said data processing device operates in the operating state;

a data processing unit adapted to execute data processing based on the data received by said reception unit;

a holding unit adapted to, in a case where a reception request of the data is input to either one of said plural reception units being in the power-saving state, hold reception factor information indicating which of said reception units receives the reception request;

a control unit adapted to execute control so as to shift the state of said first reception unit indicated by the reception factor information from the first reception state to the second reception state, and so as to, after starting the shift of the state of said first reception unit, start the shift of the state of said second reception unit from the first reception state to the second reception state; and a power supply unit adapted to supply power to said control unit, wherein, in the case where said data processing device operates in the power-saving state, said power supply unit stops the power supply to said control unit, and restarts the power supply to said control unit according to the reception of the reception request by said reception unit.

5. An image A data processing device according to claim 4, wherein said control unit executes, according to the restart of the power supply by said power supply unit, an initialization process to shift the states of at least said plural reception units from the first reception state to the second reception state, and said control unit executes the initialization process to said first reception unit prior to the initialization process to said second reception unit.

6. An image A data processing device according to claim 5, further comprising a storage unit adapted to store an initialization program for causing said control unit to execute the initialization process, wherein said control unit executes, according to the restart of the power supply by said power supply unit, the initialization process by reading the initialization program from said storage unit.

7. A data processing device which executes data processing based on input data and operates in either a power-saving state or an operating state, comprising:

plural reception units, including a first reception unit and a second reception unit, adapted to receive the data, said plural reception units being in a first reception state in the case where said data processing device operates in the power-saving state and being in a second reception state in the case where said data processing device operates in the operating state;

a data processing unit adapted to execute data processing based on the data received by said reception unit;

a holding unit adapted to, in a case where a reception request of the data is input to either one of said plural reception units being in the power-saving state, hold reception factor information indicating which of said reception units receives the reception request; and a control unit adapted to execute control so as to shift the state of said first reception unit indicated by the reception factor information from the first reception state to the second reception state, and so as to, after starting the shift of the state of said first reception unit, start the shift of the state of said second reception unit from the first reception state to the second reception state, wherein, as the state of said first reception unit is shifted from the first reception state to the second reception state, said control unit executes the control so as to start the reception process by said first reception unit.

8. A data processing device which executes data processing based on input data and operates in either a power-saving state or an operating state, comprising:

plural reception units, including a first reception unit and a second reception unit, adapted to receive the data, said plural reception units being in a first reception state in the case where said data processing device operates in the power-saving state and being in a second reception state in the case where said data processing device operates in the operating state;

a data processing unit adapted to execute data processing based on the data received by said reception unit;

a holding unit adapted to, in a case where a reception request of the data is input to either one of said plural reception units being in the power-saving state, hold reception factor information indicating which of said reception units receives the reception request;

a control unit adapted to execute control so as to shift the state of said first reception unit indicated by the reception factor information from the first reception state to the second reception state, and so as to, after starting the shift of the state of said first reception unit, start the shift of the state of said second reception unit from the first reception state to the second reception state; and an image-forming unit adapted to form an image based on the data processed by said data processing unit, wherein said control unit executes the control so as to shift the state of said image forming unit from the first reception state to the second reception state prior to the shift of the state of said first reception unit from the first reception state to the second reception state, and said control unit executes the control so as to start the data processing executed by said image data processing unit and the image forming process executed by said image forming unit according to the shifts of the states of said first reception unit and said image forming unit from the power saving state to the operating state.

9. A data processing device according to claim 1, wherein, in the first reception state, said reception unit cannot receive the data but can receive at least the reception request of the image data.

10. A control method for a data processing device which executes data processing based on input data and operates in either a power-saving state or an operating state, said method, comprising:

a holding step of, in a case where a reception request of the data is input to either one of plural reception units, including a first reception unit and a second reception unit, being in the power-saving state, holding reception factor information indicating which of the reception units receives the reception request;

a first control step of, as the reception request of the data is input to either one of the plural reception units, shifting a state of said first reception unit indicated by the reception factor information from a first reception state to a second reception state, wherein said plural reception units are in the first reception state in the case where said data processing device operates in the power-saving state and are in the second reception state in the case where said data processing device operates in the operating state;

a second control step of, after starting the shift of the state of said first reception unit from the first reception state to the second reception state in said first control step, starting the shift of a state of said second reception unit different from said first reception unit from the first reception state to the second reception state;

a data processing step of executing data processing based on the data received by said first reception unit or said second reception unit being in the second reception state; and a request step of requesting a request source of the reception request to transmit the data according to the shift of the state of the first reception unit to the second reception state, wherein said data processing step is adapted to execute the data processing based on the data transmitted in response to the request in said request step.

11. A control method for a data processing device which executes data processing based on input data and operates in either a power-saving state or an operating state, said method comprising:

a holding step of, in a case where a reception request of the data is input to either one of plural reception units, including a first reception unit and a second reception unit, being in the power-saving state, holding reception factor information indicating which of the reception units receives the reception request;

a first control step of, as the reception request of the data is input to either one of the plural reception units, shifting a state of said first reception unit indicated by the reception factor information from a first reception state to a second reception state, wherein said plural reception units are in the first reception state in the case where said data processing device operates in the power-saving state and are in the second reception state in the case where said data processing device operates in the operating state;

a second control step of, after starting the shift of the state of said first reception unit from the first reception state to the second reception state in said first control step, starting the shift of a state of said second reception unit different from said first reception unit from the first reception state to the second reception state;

a data processing step of executing data processing based on the data received by said first reception unit or said second reception unit being in the second reception state; and a third control step of, according to the shift of the first reception unit from the first reception state to the second reception state in said second control step, starting the reception process by the first reception unit.

12. A data processing device according to claim 4, wherein at least one of said plural reception units receives the data transmitted from an external device through a network.

13. A data processing device according to claim 4, wherein at least one of said plural reception units receives facsimile data transmitted from an external device through a public network.

14. A data processing device according to claim 4, wherein, in the first reception state, said reception unit cannot receive the data but can receive at least the reception request of the data.

15. A data processing device according to claim 7, wherein at least one of said plural reception units receives the data transmitted from an external device through a network.

16. A data processing device according to claim 7, wherein at least one of said plural reception units receives facsimile data transmitted from an external device through a public network.

17. A data processing device according to claim 7, wherein, in the first reception state, said reception unit cannot receive the data but can receive at least the reception request of the data.

18. A data processing device according to claim 8, wherein at least one of said plural reception units receives the data transmitted from an external device through a network.

19. A data processing device according to claim 8, wherein at least one of said plural reception units receives facsimile data transmitted from an external device through a public network.

20. A data processing device according to claim 8, wherein, in the first reception state, said reception unit cannot receive the data but can receive at least the reception request of the data.

21. A control method for a data processing device which executes data processing based on input data and operates in either a power saving state or an operating state, said method comprising:

a reception step of receiving the data by plural reception units including a first reception unit and a second reception unit, the plural reception units being in a first reception state in the case where the data processing device operates in the power saving state and being in a second reception state in the case where the data processing device operates in the operating state;

a data processing step of executing data processing based on the data received in said reception step;

a holding step of, in a case where a reception request of the data is input to either one of the plural reception units being in the power saving state, holding reception factor information indicating which of the reception units receives the reception request; and a control step of causing a control unit to execute control so as to shift the state of the first reception unit indicated by the reception factor information from the first reception state to the second reception state, and so as to, after starting the shift of the state of the first reception unit, start the shift of the state of the second reception unit from the first reception state to the second reception state; and a power supply step of supplying power to the control unit, wherein, in the case where the data processing device operates in the power saving state, said power supply step stops the power supply to the control unit, and restarts the power supply to the control unit according to the reception of the reception request in said reception step.

22. A control method for a data processing device which executes data processing based on input data and operates in either a power saving state or an operating state, said method comprising:

a reception step of receiving the data by plural reception units including a first reception unit and a second reception unit, the plural reception units being in a first reception state in the case where the data processing device operates in the power saving state and being in a second reception state in the case where the data processing device operates in the operating state;

a data processing step of executing data processing based on the data received in said reception step;

a holding step of, in a case where a reception request of the data is input to either one of the plural reception units being in the power saving state, holding reception factor information indicating which of the reception units receives the reception request; and a control step of causing a control unit to execute control so as to shift the state of the first reception unit indicated by the reception factor information from the first reception state to the second reception state, and so as to, after starting the shift of the state of the first reception unit, start the shift of the state of the second reception unit from the first reception state to the second reception state; and an image forming step of causing an image forming unit to form an image based on the data processed in said data processing step, wherein said control step executes the control so as to shift the state of the image forming unit from the first reception state to the second reception state prior to the shift of the state of the first reception unit from the first reception state to the second reception state, and wherein said control step executes the control so as to start the data processing executed in said data processing step and the image forming process executed in said image forming step according to the shifts of the states of the first reception unit and the image forming unit from the power saving state to the operating state.

* * * * *